United States Patent [19]

Brokaw

[11] Patent Number: 5,030,849
[45] Date of Patent: Jul. 9, 1991

[54] MONOLITHIC RATIOMETRIC TEMPERATURE MEASUREMENT CIRCUIT

[75] Inventor: A. Paul Brokaw, Burlington, Mass.

[73] Assignee: Analog Devices, Inc., Norwood, Mass.

[21] Appl. No.: 374,458

[22] Filed: Jun. 30, 1989

[51] Int. Cl.$^5$ .................. H03K 3/26; G06G 7/10
[52] U.S. Cl. .................... 307/310; 307/491
[58] Field of Search ............... 307/310, 491; 324/105, 324/104, 65 R

[56] References Cited

U.S. PATENT DOCUMENTS

| | | | |
|---|---|---|---|
| 3,882,725 | 5/1975 | Rao et al. | 307/310 |
| 3,921,453 | 11/1975 | Platzer, Jr. | 307/310 |
| 3,934,476 | 1/1976 | Lamb, II | 307/310 |
| 3,973,147 | 8/1976 | Yu | 307/310 |
| 4,556,330 | 12/1985 | Regtien | 307/310 |
| 4,650,347 | 3/1987 | Shigemura et al. | 307/310 |
| 4,883,992 | 11/1989 | Koglin et al. | 307/310 |

FOREIGN PATENT DOCUMENTS

| | | |
|---|---|---|
| 1943157 | 4/1970 | Fed. Rep. of Germany . |
| 2518890 | 4/1976 | Fed. Rep. of Germany . |
| 2900323 | 7/1980 | Fed. Rep. of Germany . |
| 2229961 | 12/1974 | France . |
| 1027566 | 4/1966 | United Kingdom . |

OTHER PUBLICATIONS

Nelson, "Simple Circuit Compensates Platinum Temperature Sensor", Jun. '85, 66-68, The Industrial and Process Control Magazine.

Dunets et al., Improved Accuracy in Compensating for Temperature Change at the Free Ends of Thermoelectric Sensors, May '88, Measurement Techniques, vol. 31, No. 5, pp. 474-476.

Primary Examiner—Stanley D. Miller
Assistant Examiner—Richard Roseen
Attorney, Agent, or Firm—Wolf, Greenfield & Sacks

[57] ABSTRACT

A signal conditioning circuit for an RTD includes feedback means to correct for the non-linear temperature characteristic of the RTD. The feedback means applies to the RTD a voltage which is a linear function of temperature, plus a fixed offset. The output signal from the circuit is proportional both to the RTD temperature and to the supply voltage. The resistors in the feedback system can be trimmed easily at a single temperature to calibrate the output. It can be combined with a metal film RTD on a single chip. The trimming can compensate for wide differences in RTD resistances.

7 Claims, 1 Drawing Sheet

MONOLITHIC RATIOMETRIC TEMPERATURE MEASUREMENT CIRCUIT

FIELD OF THE INVENTION

This invention relates to temperature sensors and, more particularly, to a temperature sensor with output proportional to power supply voltage, capable of being trimmed to high accuracy and suitable for implementation as an integrated circuit.

BACKGROUND

Temperature sensors are needed in a large number of disparate situations. Of particular interest here are resistance temperature detectors, commonly referred to as "RTD's". RTD's are among the most widely used temperature sensors for electrical temperature measurement applications. They are generally reasonable in size and production cost, and are useful over a wide range of operating temperatures. For example, platinum RTD's are used as interpolation standards from the oxygen point (i.e., −182.96° C.) to the antimony point (i.e., 630.74° C.) As it is a a passive, resistive element, an RTD requires signal conditioning circuitry in order to generate a voltage or current signal indicative of its resistance value and, therefore, the RTD temperature. While many such signal conditioning circuits exist, these prior art conditioning circuits generally are unsuited to monolithic fabrication with an RTD in a single integrated circuit. Additionally, prior art signal conditioning circuits do not function well in automotive applications, an environment for which the present invention is particularly intended.

The automotive environment is quite hostile to electronics. Temperature sensors for use on the engine or in the engine compartment must be designed to operate over temperature ranges from −50° C. to +150° C. The supply voltage, although specified at (for example) 5V±0.5V may actually be as high 15.0V and may fluctuate considerably with changing load conditions on the battery and alternator, and with the occurrence of switching transients. Since the RTD temperature is determined by measuring its resistance, the measurement is highly dependent on a voltage or current excitation. In turn, this excitation is dependent on the supply voltage. Accordingly, a need exists for an RTD with a signal conditioning circuit which can provide an analog outlet signal which is functionally related both to RTD temperature and to the supply voltage. Further, the functional relationship must be such as to account for the actual supply voltage at the time a temperature measurement is made.

Preferably, the analog output of the signal conditioning circuitry, when adjusted for supply voltage deviation from nominal, varies linearly with RTD temperature.

To facilitate manufacture, it is also desirable that any adjustments and trimming of the RTD and signal conditioning circuit be performed at one temperature.

In the automotive environment, it is further desirable to provide the RTD and signal conditioning circuitry in a single package, capable of withstanding significant vibration. Certain types of RTD's can be ruled out because they are too sensitive to vibration.

Accordingly, it is an object of the present invention to provide a new signal conditioning circuit for an RTD.

A further object of the invention is to provide for an RTD a signal conditioning circuit, which supplies an output signal which is ratiometric to a supply voltage (i.e., varies linearly with changes in supply voltage).

Still another object of the invention is to provide for an RTD a signal conditioning circuit which is easily calibrated at a single temperature.

A further object of the invention is to provide an RTD signal conditioning circuit suitable for an automotive environment.

SUMMARY OF THE INVENTION

The foregoing and other objects are achieved with a signal conditioning circuit for an RTD which includes feedback means to correct for the non-linear temperature characteristic of the RTD. The feedback means applies to the RTD a current which is a linear function of temperature, plus a fixed offset. The output signal voltage from the circuit is proportional both to the RTD temperature and to the supply voltage. The resistors in the feedback system can be trimmed easily at a single temperature to calibrate the output. It can be combined with a metal film RTD on a single chip. The trimming can compensate for wide differences in RTD resistances.

The invention and its advantages will be more fully understood from the detailed description provided below, which should be read in conjunction with the accompanying drawing.

DETAILED DESCRIPTION

Figure 1:
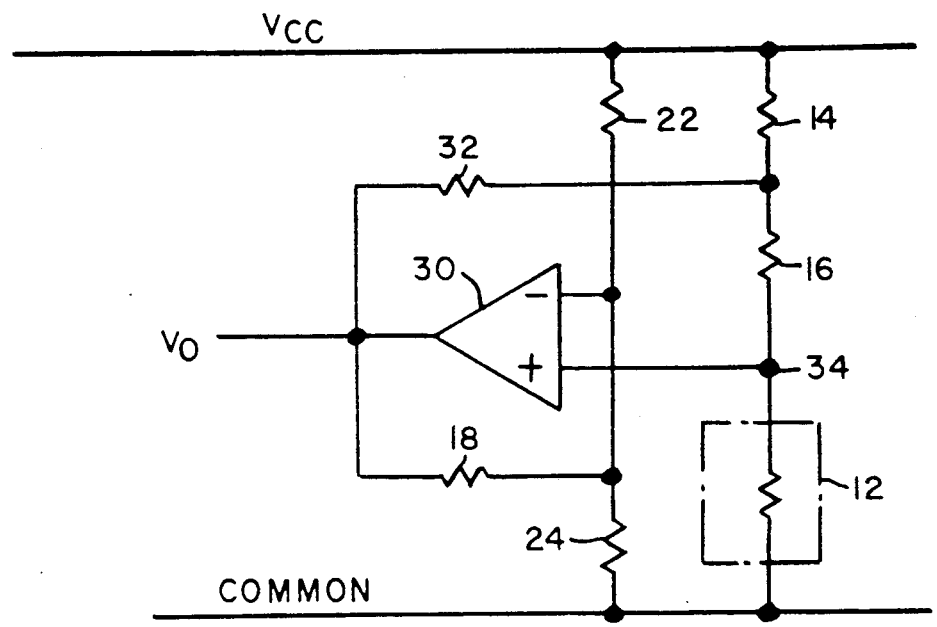
FIG. 1 is a schematic circuit diagram for an RTD signal conditioner according to the present invention.

FIG. 1 shows a schematic circuit diagram for a basic ratiometric RTD signal conditioner 10 according to the present invention. Resistor 12 is an RTD providing a resistance approximately proportional to temperature. The other resistances are presumed to be temperature-invariant. Voltage developed across resistor 12, by current from the supply $V_{cc}$ through resistors 14 and 16, is amplified by a non-inverting gain provided by amplifier 30 and determined by resistor 18 and the resistance of resistors 22 and 24 in parallel in the feedback loop of amplifier 30. Resistors 22 and 24 introduce an offset voltage at the inverting input of amplifier 30. This offset establishes the zero output temperature point.

Typically, the resistance value of resistor 12 is a non-linear function of temperature. (For short, the resistance of resistor xx will hereinafter be identified as $R_{xx}$.) Although the resistance is roughly proportional to temperature, it falls away from linearity in a way that can often, for many metals, be modelled by the Callendar-Van Deusen equation:

$$R_T = R_o + \alpha R_o \left[ T - \delta \left( \frac{T}{100} - 1 \right) \left( \frac{T}{100} \right) - \phi \left( \frac{T}{100} - 1 \right) \left( \frac{T^3}{100} \right) \right]$$

where
- $R_T$ = resistance at temperature T
- $R_o$ = resistance at T = 0° C.
- $\alpha$ = temperature coefficient at T = 0° C.
- $\delta, \phi$ = experimentally-derived coefficients The positive feedback network including resistors 32 and 14 provides a correction for this non-linearity.

To facilitate monolithic manufacture, RTD 12 may be fabricated of thin-film aluminum, rather than platinum, and the other resistors may be fabricated of SiCr. The SiCr resistors may be trimmed at a single temperature, as explained below.

After selection of initial values for the resistances, the voltage at node 34 is fixed at a level which approximately centers the output voltage $V_o$ in the middle of its span. The voltage at node 34 is measured, and if necessary the "gain" from the supply voltage line $V_{cc}$ to the output $V_o$ is adjusted by trimming resistor 22 while varying the supply voltage. Then if necessary the "gain" from node 34 to the output is adjusted by trimming resistor 24 while varying the voltage on node 34. Finally, the output voltage is adjusted to cause the circuit to indicate the RTD temperature, measured independently, by trimming resistor 16.

Digressing briefly, this approach involves recognition of the fact that the resistance of RTD 12, as expressed above in the Callendar-Van Dusen equation, can be approximated by the expression $R_{12} = A + BT + CT^2$, and that if the output is linearized, the current through RTD 12 can be expressed as $i = -D + ET$, where T is temperature, and the other coefficients are numbers to be determined. The product of these two factors should represent a linear voltage FT, with an offset H, across RTD 12. This equality may be expressed as: $(A + BT + CT^2)(D + ET) = FT + H$, which may be rewritten as $AD + BDT + CDT^2 + AET + BET^2 + CET^3 = FT + H$. Equating coefficients of terms in like powers of T gives $H = AD$, $F = BD + AE$, $CD + BE = 0$, and $CE = 0$. Assuming that both C and E are not zero, this result cannot be exactly achieved. However, if C (i.e., the non-linearity) and E (i.e., the correction for it) are both small, the result can be approximated. From the foregoing relationships, we can readily obtain $E = -CD/B$ and $F = BD - ACD/B = D(B - AC/B)$, where F will be the slope of the temperature-sensitive voltage at node 34. If G is the gain from node 34 to the output, $V_o$, then the scale factor is FG. Therefore, the non-inverting voltage gain of the trimmed amplifier should be given by $G = Sf/F = Sf/(D(B - AC/B))$, where Sf is the scale factor of the output expressed in units of volts/°C.

The indicated temperature offset at the output is produced by the fact that resistor 22 is connected to the supply voltage. So far as offset is concerned, the amplifier can be treated as an inverting amplifier with gain $-R_{18}/R_{22}$. At the temperature which is intended to give zero output, the supply voltage multiplied by the ratio of the resistances of resistors 18 and 22 should equal G times the voltage at node 34. When the voltage at node 34, G, and the temperature offset have been determined, the resistor 22 can be trimmed by forcing the voltage of node 34 to a value which puts the output between its limits, and adjusting the resistance of resistor 22 to give the proper gain with respect to a small signal applied on the $V_{cc}$ supply lead.

Once the ratio $R_{22}/R_{18}$ is set, resistor 24 can be trimmed, unambiguously, to give a gain G from node 34 to the output. The supply voltage is fixed at the nominal level and a small signal then is applied at node 34, to measure the gain. Then, resistor 24 is trimmed to result in the proper value of G.

Figure 2:
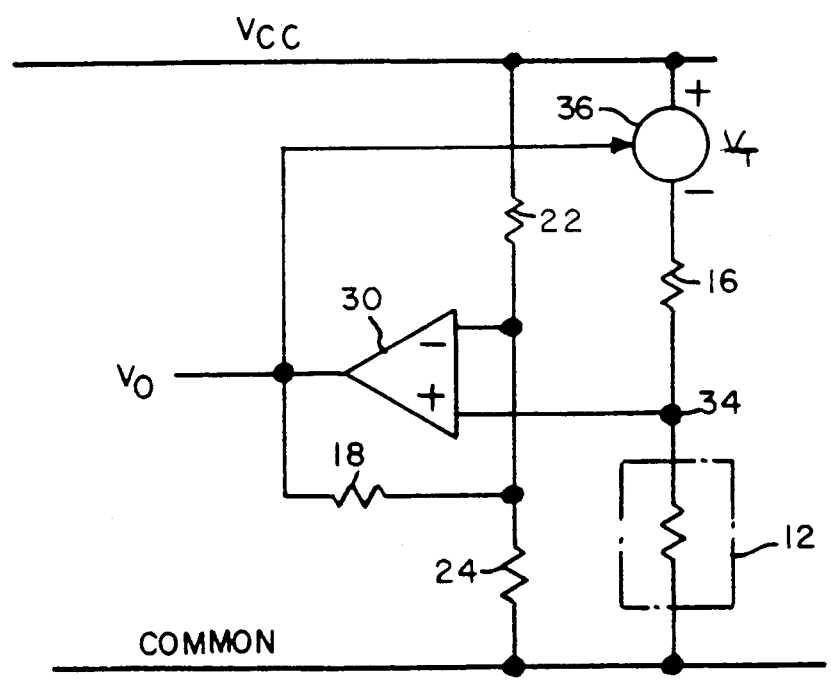
FIG. 2 is a modified, but functionally equivalent, redrawing of the circuit of FIG. 1.

Resistor 16 must next be trimmed to give both the correct scale factor, Sf, and the proper amount of positive feedback to linearize the output. To understand this process, it will be helpful to refer to FIG. 2, which shows an equivalent circuit to that of FIG. 1. An equivalent circuit representation has been shown for the drive and compensation of RTD12. The positive feedback provided by resistors 32 and 14 is evaluated by means of its Thevenin equivalent. For these purposes, the feedback and drive is transformed to a scaled down version of the output voltage referred to $V_{cc}$ modified by the parallel resistance of resistors 14 and 32, which is then placed in series with resistor 16. The voltage source 36 thus provides an equivalent source voltage $V_T = (V_{cc} - V_o) R_{14}/(R_{32} + R_{14})$. For convenience of notation, a parameter K can be defined as $K = R_{14}/(R_{32} + R_{14})$. Then, $V_T = K(V_{cc} - V_o)$. The drive current is given by $V_{cc}$ reduced by the Thevenin voltage applied to the equivalent parallel resistance of resistors 32, 14, 16, and 12. Note that the actual excitation current is produced by the voltage across resistor 16 and the combination of resistors 14 and 32. As the voltage at node 34, at the top of RTD 12, rises, it affects the drive. Therefore, even if the resistance of RTD 12 were exactly proportional to temperature, the network of resistors 14 and 32, or their equivalent, would be required to raise the voltage at the top of the series resistance by the same amount as the voltage across resistor 12. This would keep the excitation current constant and make the voltage at node 34 proportional to temperature. If the RTD is a metal film resistor, the change in resistance of the film departs from strict temperature proportionality as described above. The equation describing the voltage at node 34 has a factor $D + ET$, which represents the excitation current. This current results from the net voltage across resistor 16 and the combination of resistors 14 and 32. This voltage will be called $V_X$. Note that $V_X$ is the difference between the voltage at the bottom of the Thevenin source and the voltage at node 34, which was previously given as $FT + H$. Thus, $$V_X = K(V_o - V_{cc}) + V_{cc} - (FT + H)$$
$$= KV_o + V_{cc}(1 - K) - H - FT.$$

The output voltage, $V_o$, is the combination of the voltage at node 34, multiplied by the gain G and the offset voltage $V_{os}$ produced by resistor 22: $V_o = -V_{os} + G(FT + H)$. Therefore, we can rewrite $V_X$ as $$V_X = KV_{os} + KGFT + KGH - FT + V_{cc}(1 - K) - H$$
$$= K(V_{os} + GH - V_{cc}) + V_{cc} - H + F(KG - 1)T.$$

We want this voltage to produce a current of the form $D + ET$ when it appears across a fixed resistance. By rewriting $V_X$ further, terms may be identified to have the same form as required by the approximated Callendar-Van Deusen equation, and like terms can then be matched. This allows one to write $$V_X = (K(V_{os} + GH - V_{cc}) - V_{cc} - H)(1 - Q),$$

where $$Q = \frac{F(KG - DT)}{K(V_{os} + GH - V_{cc}) + V_{cc} - H}.$$

The portion of $V_X$ which gives terms corresponding to $E/D$ may be set equal to $-C/B$, which then yields $$K = \frac{F - (V_{cc} - H) C/B}{FG + (V_{os} + GH - V_{cc}) C/B}$$

Substituting above derived terms yields $F = HB/A - HC/B$. This may be substituted into the equation for $V_X$, and then after proper collection of terms, the result is obtained that $$K = \frac{HB^2/(AC) - V_{cc}}{GHB^2/(AC) + V_{os} - V_{cc}}, \quad (100)$$

but K was defined in terms of a certain set of resistance values. That original definition may be substituted into the foregoing expression.

Also needed is the total resistance of the resistor 16 and resistor 32, 14 combination. This resistance which will be designated $R_X$, divides $V_X$ to make D, the excitation current constant. Thus, $D = V_X/R_X$. Substituting for $V_X$ and rearranging, the equation may be solved for $R_X$ as follows: $R_X = K(V_o - V_{cc}) + V_{cc} - (FT + H))/D$. At temperature $T = 0$, D is the total excitation current and $FT + H$ is the resistance. Therefore, if $R_{12}(0)$ is the zero degree value of $R_{12}$, then $$R_X = ((K(V_o - V_{cc}) + V_{cc})/D) - R_{12}(0).$$

The evaluation is simplified if the circuit values are selected at $T = 0$, and if that can be arranged to be inside the desired measurement ranges. It is convenient to translate the resistor parameters for an effective zero into the desired range. For example, substituting $T_S + 300°$ into the Kelvin temperature version of the RTD expression will translate it to a temperature range zeroed at 27° C. This is a reasonable place to start the synthesis for a circuit intended to be operable from $-50°$ C. to $+150°$ C. and has some advantages, both for trimming and simulation. The nominal resistor values can be calculated along with other numbers needed to trim the circuit.

The larger the voltage across RTD 12, the less the gain and offset of the amplifier will contribute to error. There is a trade-off between a large resistance, which uses much area, and high current, which results in self-heating. Based on this trade off, $R_{12}(0)$, the nominal resistance and the design temperature, and D, the excitation current, are selected. Note that at $T = 0$, $FT + H = H$, and H is DA. Therefore, the nominal value of the voltage at node 34 is H at $T = 0$.

The scale factor is the desired temperature coefficient of the output voltage and F is the temperature coefficient of the voltage at node 34. Therefore, the gain G can be determined from their ratio: $G = Sf/F$. By substitution, $G = Sf/((HB/A) - HC/B)$.

$V_{os}$ is the difference between the desired output and GH, at the design temperature. Thus, $V_{os}$ = Desired Output (at design temp.) $- GH$. Using G and $V_{os}$, the resistances of resistors 18, 22 and 24 can be selected. First, resistance 18 can be picked to be easy to drive, remembering that the resistance of resistor 24 will be about G times smaller then resistance 18. It won't be necessary to trim resistor 18, but it should not be so small that resistor 24 is difficult to make, nor so large that it consumes undue area. The amplifier input current will flow in resistor 18, so it should be sized to minimize errors.

The output offset voltage is induced by the current $V_{CC}/R_{22}$, rather than by the difference in $V_{cc}$ and the voltage in node 34. Thus, $V_{os} = -V_{cc}R_{18}/R_{22}$, which may readily be solved for $R_{22}$. Next, the non inverting gain of the amplifier is given by $(R_{18}/R_P) + 1$, where $R_P$ is the parallel resistance of resistors 22 and 24, or $G = 1 + R_{18}/R_P$, which may be solved for $R_P$, yielding $R_P = R_{18}/(G - 1)$. Continuing, $R_{24}$ may be found in terms of $R_P$ and $R_{22}$ in a straightforward manner. Through a substitution of variables from the foregoing equations, we then obtain $R_{24} = R_{18}V_{cc}/(V_{os} + V_{CC})$ $G - 1))$.

Using the values of $V_{os}$ and G that have been calculated, the value of K can now be computed from equation 100.

The value of the $R_{14}$ is not tightly constrained. The ratio of $R_{32}$ and $R_{14}$ is determined by K, but their values can be scaled up and down, limited by the value of $R_X$. The parallel value of $R_{32}$ and $R_{14}$ must be less than $R_X$. In principle, if the former two resistances were properly chosen, resistor 16 could be eliminated. In practice, however, RTD 12 will probably not have the correct value, as fabricated. It will be difficult to adjust RTD 12 directly. However, if resistor 16 is in place, it can be trimmed to adjust for variations in RTD 12, and the sheet resistance of the other resistors, as well. When resistors 14 and 32 are selected, the resistance of $R_{16}$ will be the residue of $R_X$ when their parallel combination is subtracted.

Selecting $R_{14}$ to be large enough to be fabricated conveniently and significantly less than $R_X$, permits $R_{32}$ to be calculated as $R_{32} = R_{14}((1/K) - 1)$. The nominal value for $R_{16}$, is then simply $$R_{16} = R_X - R_{32}R_{14}/(R_{32} + R_{14}).$$

If resistors 22 and 24 are to be trimmed, their initial fabrication (i.e., layout) values need only be slightly smaller than their design center values, to allow for trimming to remove initial ratio errors. The initial fabrication value for resistor 16 must be sufficiently low as to permit it to be trimmed to compensate for the total variability in thin film and RTD sheet resistances. In the trimming of resistor 16, $R_X$ is actually being trimmed. Note that in the Thevenin equivalent, $R_X$ can be scaled to make the voltage on node 34 equal the nominal value H at the design temperature. When this is done, the proportion of $V_o$ feedback will be correct, and the temperature compensation at node 34 will be correct.

As an example, consider a design to achieve a scale factor of 22.5 mV/°C. with $V_o = 0.25V$ at $-50°$ C. The nominal $V_{cc}$ will be $+5V$. The RTD will be an aluminum thin film; data for the RTD is specified at 27° C. From the approximated Callendar-Van Dusen equation and known coefficients for the thin film aluminum, $$R_{12}(o) = 445.8\Omega + (1.683\Omega/°)$$
$$T - (1.667 \times 10^{-4}\Omega/°^2)T^2.$$

The nominal excitation at 27° C. is selected to be 200 $\mu$A. This yields $DA(T = 0) = 200$ $\mu A \times 445.8\Omega = 89.16$ mV.

Next, 22.5 $mV/°/((1.683\Omega/°/445.8\Omega) + 1.667E-4\Omega/°^2/1.683\Omega/°) = 5.8075234V$ and
$G = GH/H = 65.135973$.

At 27° C., the desired output is $$V_o = (22.5\ mV/°C) \times [27°\ C. - (-50°\ C.)] + 0.25V = 1.9825V$$

and $$V_{os} = 1.9825V - 5.8075234V = -3.8250234V.$$

Set $R_{18} = 100$ K$\Omega$, as being easy to drive but not too large. Then, $$R_{22} = (-5V)(100K\Omega)/-3.8250234V = 130.71815K\Omega$$

and $$R_{24} = (100K\Omega)(5V)/-3.8250234V + 5V(64.135973)) - = 1.578009K\Omega$$

$K = 0.036486289$
$R_X = 24.003713K\Omega$

Let $R_{14} = 3K\Omega$. Then $R_{32} = 79.222665K\Omega$. Finally, the parallel combination of $R_{32}$ and $R_{14}$ is given by $R_{32,14} = 2.890541\Omega$, so that $R_{16} = 21.113171K\Omega$. The "layout" value for $R_{16}$ prior to trimming should be considerably less. It must be low enough to supply enough current to bring the lowest possible value of $R_{12}(0)$ to the calculated voltage, H.

Any error in the ratios between $R_{32}$, $R_{14}$ and the other resistors will be corrected when $R_{16}$ is trimmed.

Thus, it will be seen that there have been shown and described a signal conditioning circuit which can be monolithically fabricated with an integral RTD of aluminum, platinum, or other material. The resistances in the circuit are capable of being trimmed during fabrication, to provide an output signal which is not only proportional to RTD temperature, but also varies linearly with the supply voltage. Individual resistances in the circuit may be trimmed to adjust their ratios to other resistances. One resistor may be trimmed to compensate the ratio of the RTD resistance to the thin-film resistances.

Of course, if a constant-voltage power supply is used, the output voltage will vary linearly with RTD temperature alone.

Having thus described the inventive concept as well as circuitry and a method for implementing the invention, it will be understood that the foregoing is presented by way of example only and is not intended to be limited of the invention. Various alterations, modifications and improvements will readily occur to those skilled in the art and are intended to be suggested by this disclosure, although not expressly stated herein. Accordingly, the invention is limited only by the following claims and equivalents thereto:

I claim:

1. In a signal conditioning circuit to be powered from a supply voltage, and including a resistance temperature detector (RTD) whose resistance varies approximately proportionally to temperature and means for deriving from the RTD an output signal varying linearly with the RTD temperature, said means further including means connected to receive the supply voltage, for applying to the RTD a current drive signal and means for providing an output voltage as a function of the voltage developed across the RTD, the improvement comprising:
the means for applying a current drive signal to the RTD being adapted to apply thereto a drive signal which varies linearly with supply voltage and temperature but is offset from zero at a predetermined temperature, said means being adapted to be calibrated at a single temperature to produce said linear variation.

2. A signal conditioning circuit powered from a supply voltage, for deriving from a resistance temperature detector (RTD) an output signal varying linearly with the RTD temperature and with the supply voltage, comprising:
   a. means for sensing the voltage developed across the RTD and for providing an output signal in response thereto, said output signal varying also with supply voltage applied to the means for sensing; and
   b. means for applying to the RTD a current drive signal responsive both to the output signal and to the supply voltage, the drive signal varying linearly with temperature and supply voltage but being offset from zero at a predetermined temperature.

3. The circuit of claim 2 wherein the means for applying to the RTD a current drive signal includes a resistor in series with the RTD and wherein the resistance of said resistor may be trimmed at a single temperature to calibrate the circuit for providing said linear variations.

4. A signal conditioning circuit adapted to be powered from a supply voltage applied between a supply node and a ground node, for deriving from a resistance temperature detector (RTD) an output signal varying linearly with the RTD temperature and with the supply voltage, comprising:
   a. a controlled voltage source;
   b. a first resistor;
   c. the controlled voltage source and first resistor being connected in series with the RTD, between the supply node and the ground node, with one lead of the RTD being connected to the ground node;
   d. an operational amplifier having an inverting input, a non-inverting input, and an output;
   e. a second resistor connected between the supply node and the inverting input of the operational amplifier;
   f. a third resistor connected between the inverting input of the operational amplifier and the ground node;
   g. a fourth, feedback resistor connected between the output of the operational amplifier and the inverting input thereof;
   h. the non-inverting input of the operational amplifier being connected to a lead of the RTD opposite the lead connected to the ground node; and
   i. the voltage source providing a voltage which varies linearly with the output voltage from the operational amplifier.

5. The circuit of claim 4 wherein the controlled voltage source comprises (i) a fifth resistor connected between the supply node and one end of the first resistor and (ii) a sixth resistor also having one end connected to the same end of the first resistor and a second end connected to the output of the operational amplifier.

6. The circuit of any of claims 1–5 wherein the RTD and all other components of the circuit are formed on a common substrate.

7. The circuit of claim 4 or claim 5 wherein the RTD is formed of a selected metal film and the other resistors are formed of a different material.

* * * * *